United States Patent [19]
Witkowski et al.

[11] Patent Number: 5,892,926
[45] Date of Patent: Apr. 6, 1999

[54] DIRECT MEDIA INDEPENDENT INTERFACE CONNECTION SYSTEM FOR NETWORK DEVICES

[75] Inventors: Michael L. Witkowski; William J. Walker; Mohammad A. Khan; Gary B. Kotzur; Dale J. Mayer, all of Harris County, Tex.

[73] Assignee: Compaq Computer Corporation, Houston, Tex.

[21] Appl. No.: 777,565

[22] Filed: Dec. 30, 1996

[51] Int. Cl.⁶ .................................................. G06F 13/00
[52] U.S. Cl. ...................... 395/280; 395/200.8; 395/309
[58] Field of Search ................. 395/200.8, 309, 395/200.57, 200.62, 280; 370/278, 463

[56] References Cited

U.S. PATENT DOCUMENTS

| | | | |
|---|---|---|---|
| 4,204,251 | 5/1980 | Brudevald | 395/309 |
| 4,535,444 | 8/1985 | Falzone et al. | 370/384 |
| 4,590,467 | 5/1986 | Lare | 340/825.5 |
| 4,672,570 | 6/1987 | Benken | 395/200.8 |
| 5,321,819 | 6/1994 | Szczepanek | 395/200.58 |
| 5,446,914 | 8/1995 | Paul et al. | 395/200.65 |
| 5,577,023 | 11/1996 | Morum et al. | 370/225 |
| 5,619,652 | 4/1997 | Travaglio et al. | 395/200.8 |
| 5,659,684 | 8/1997 | Giovannoni et al. | 395/200.8 |
| 5,673,254 | 9/1997 | Crayford | 370/231 |
| 5,701,411 | 12/1997 | Tran et al. | 395/200.8 |
| 5,784,559 | 7/1998 | Frazier et al. | 370/229 |
| 5,784,573 | 7/1998 | Szczepanek et al. | 395/200.8 |

*Primary Examiner*—Gopal C. Ray
*Attorney, Agent, or Firm*—Akin, Gump, Strauss, Hauer & Feld, LLP

[57] ABSTRACT

A direct media independent interface (DMII) connection for a network device including a data link circuit, a connector, a clock circuit and a crossover connection. The data link circuit includes a reconciliation circuit that transmits and receives signals according to the MII standard. The clock circuit asserts at least one MII clock signal on the crossover connection to synchronize data transfer. The crossover connection crosses MII transmit signals with MII receive signals. A grounding circuit is optionally provided to ground one or more of the MII signals that are not required for the DMII connection. The connector may be a standard MII connector, or may be implemented as a minimum or reduced profile connector for carrying only the desired MII signals. The crossover connection is performed internally within the DMII port, or externally by a crossover cable. The cable is a standard MII cable, or is implemented as a minimum or reduced profile cable. The clock and ground circuits may be incorporated within either or both DMII ports, or may be incorporated within a crossover cable.

20 Claims, 14 Drawing Sheets

| CONTACT | SIGNAL NAME | CONTACT | SIGNAL NAME |
|---|---|---|---|
| 1 | +5 V | 21 | +5 V |
| 2 | MDIO | 22 | COMMON |
| 3 | MDC | 23 | COMMON |
| 4 | RXD<3> | 24 | COMMON |
| 5 | RXD<2> | 25 | COMMON |
| 6 | RXD<1> | 26 | COMMON |
| 7 | RXD<0> | 27 | COMMON |
| 8 | RX_DV | 28 | COMMON |
| 9 | RX_CLK | 29 | COMMON |
| 10 | RX_ER | 30 | COMMON |
| 11 | TX_ER | 31 | COMMON |
| 12 | TX_CLK | 32 | COMMON |
| 13 | TX_EN | 33 | COMMON |
| 14 | TXD<0> | 34 | COMMON |
| 15 | TXD<1> | 35 | COMMON |
| 16 | TXD<2> | 36 | COMMON |
| 17 | TXD<3> | 37 | COMMON |
| 18 | COL | 38 | COMMON |
| 19 | CRS | 39 | COMMON |
| 20 | +5 V | 40 | +5 V |

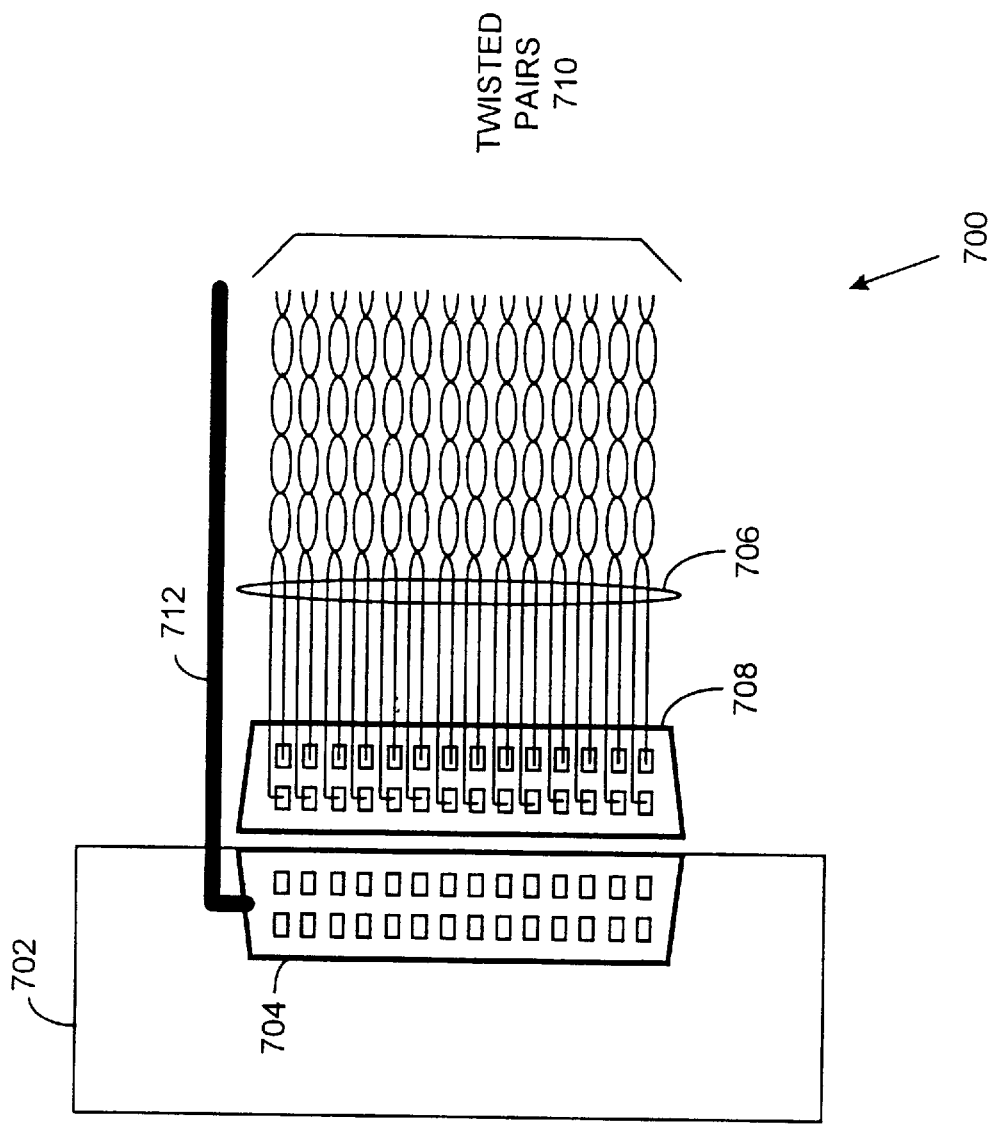

DIRECT MEDIA INDEPENDENT INTERFACE CONNECTION SYSTEM FOR NETWORK DEVICES

FIELD OF THE INVENTION

The present invention relates generally to the field of networking devices, and more particularly to a direct media independent interface connection that connects network devices.

DESCRIPTION OF THE RELATED ART

There are many different types of networks and network systems for sharing files and resources or for otherwise enabling communication between two or more computers. The term "network device" generally refers to a computer linked to a network via a network interface card (NIC), or refers to other devices that perform specialized functions in the network, such as repeaters, bridges, switches, routers, brouters, to name a few examples. Networks may be categorized based on various features and functions, such as message capacity, range over which nodes are distributed, node or computer types, node relationships, topology or logical and/or physical layout, architecture or structure based on cable type and data packet format, access possibilities, etc. For example, the range of a network refers to the distance over which nodes are distributed, such as local-area networks (LANs) within an office or floor of a building, wide-area networks (WANs) spanning across a college campus, or a city or a state and global-area networks (GANs) spanning across national boundaries.

Many networks operate in accordance with the OSI (Open Systems Interconnection) Reference Model, which is a seven-layer model developed by the ISO (International Standardization Organization). The OSI Reference Model describes how to interconnect any combination of network devices in terms of seven functional layers organized in a hierarchy, and specifies the functions that must be available at each layer. From highest level of the hierarchy to lowest level of the hierarchy, the OSI Reference Model includes the Application layer, the Presentation Layer, the Session Layer, the Transport Layer, the Network Layer, the Data-Link Layer and the Physical Layer.

Network architectures (such as Ethernet, ARCnet, Token Ring, and FDDI) encompass the Data-Link and Physical Layers and represent the most common protocols used. The Data Link layer is responsible for constructing and transmitting data packets as well as receiving and deconstructing data packets, both sequences based upon the network architecture being employed. The Data-Link layer provides services for the various protocols at the Network Layer and uses the Physical Layer to transmit and receive the data packets. In a Local Area Network Carrier Sense Multiple Access with Collision Detection (LAN CSMA/CD) implementation according to the Institute of Electrical and Electronics Engineers, Inc. (IEEE) Standard 802.3 or 802.3u-1995 (IEEE 802.3 Standards), the Data-Link Layer is divided into two sub-layers, the Logical-Link Control (LLC) sub-layer at the top and the Media-Access Control (MAC) sub-layer at the bottom. The LLC sub-layer provides an interface for the Network Layer protocols while the MAC sub-layer provides access to a particular physical encoding and transport scheme of the Physical Layer. The MAC sub-layer is typically executed by a MAC device that operates at one of several standard clock frequencies.

The Physical Layer receives data packets from the Data-Link Layer above it and converts the contents of these packets into a series of electrical signals that represent 0 and 1 values in a digital transmission. These signals are sent across a transmission medium to the Physical Layer at the receiving end. At the destination, the Physical Layer converts the electrical signals into a series of bit values, which are grouped into packets and passed up to the Data-Link Layer of the destination device by the Physical Layer of the destination network device.

Several structures and protocols are known for implementing the Data Link and Physical Layers. Ethernet using coaxial, twisted pair or fiber-optic cables operates at 10 megabits per second (Mbps) (e.g. 10Base-T, 10Base-F) while fast Ethernet operates at 100 Mbps (e.g. 100Base-T, 100Base-FX). ARCnet (Attached Resource Computer Network) is a relatively inexpensive network structure using coaxial, twisted pair or fiber-optic cables operating at 2.5 or 20 Mbps. Token Ring topologies use special IBM cable or fiber-optic cable and operate between 1 and 16 Mbps. Fast Token Ring operates at 100 Mbps. A new standard is being developed called ATM (Asynchronous Transfer Mode), which operates at speeds of 25.6 or 155 Mbps, although newer versions may operate at even higher data rates. Of course, many other network structures are known and available.

The transfer rate of a network is primarily fixed by the selected physical medium and the protocol or structure supporting the physical medium. The various known structures or protocols provide a benefit of enabling communication over relatively long distances at the given transfer rate. However, the data transfer rate is fixed regardless of the length of the cable. Also, medium dependent hardware devices required to impress and recover the encoded signals on the physical medium are often relatively expensive, but are required even for relatively short cable lengths. New standards are being developed to provide greater bandwidth. However, new medium dependent hardware devices will still be required with these new standards to impress and decode the encoded signals on the physical medium regardless of cable length.

A network may be expanded by using one or more repeaters, bridges, switches or similar devices. A repeater is a device that moves all packets from one network segment to another by regenerating, re-timing, and amplifying the electrical signals. A bridge is a device that operates at the Data-Link Layer of OSI Reference Model and passes packets from one network to another and increases efficiency by filtering packets to reduce the amount of unnecessary packet propagation on each network segment. A switch is a network device similar in function to a multiport bridge, but includes a plurality of ports for coupling to several similar networks for directing network traffic among the networks. A switch may also include a second set of ports for coupling to higher speed network devices, such as one or more uplink ports.

For example, a switch may include many 10 Mbps Ethernet ports and one or more 100 Mbps uplink ports to connect to another switch or a repeater. An uplink between two switches may suffice for a certain number of network devices, but may become a bottleneck for a larger number of network devices. Furthermore, the hardware to interface the physical medium coupled between the switches is the same even if the switches are relatively close to each other. Thus, the same hardware is required for all configurations, even where two or more switches are stacked together at a central location. Nonetheless, the interface between the switches is medium dependent and the transfer rate has been fixed according to the selected medium and protocol.

It is therefore desired to provide a improved bandwidth connection between network devices that increases the data transfer capability, or bandwidth, between the network devices. It also is desired to provide an improved bandwidth connection that is substantially in compliance with existing connections, but which is not medium dependent. It is also desired to provide such an improved bandwidth connection that may connect to existing devices that have been constructed to operate in accordance with the OSI Reference Model and the specifications of the IEEE.

SUMMARY OF THE INVENTION

A network device with a direct media independent interface (DMII) connection according to the present invention includes a data link circuit that transmits and receives data according to the MII format, a connector, a crossover connection and a clock circuit. The data link circuit typically includes a reconciliation circuit that transmits and receives signals according to the MII format. The connector enables external connection of the MII signals and the crossover connection crosses MII transmit and receive MII signals to enable direct MII communication. The clock circuit asserts at least one clock signal on the crossover connection to synchronize data transfer.

The MII signals include transmit data signals, a transmit delimiter signal, a transmit error signal, a transmit clock signal, receive data signals, a receive delimiter signal, a receive error signal and a receive clock signal. In one embodiment, the connector is a standard MII connector including contacts for each of the MII signals. In another embodiment, the connector is a minimum profile connector including only 14 contacts for the transmit and receive MII signals. In a reduced profile embodiment, the connector includes 14 contacts for the MII transmit and receive signals and 14 common signals for MII signal return paths.

The clock circuit asserts at least one clock signal on one or both of the MII clock signals. Thus, in one embodiment, the DMII ports of two network devices each include a clock circuit providing an MII clock signal. In another embodiment, either network device includes a DMII port providing both MII transmit and receive clock signals. The clock signal is operated at a frequency of at least 25 megahertz (MHz) or higher depending upon the desired bandwidth of data communication.

The clock circuit of the DMII connection may operate at 25 megahertz (MHz), 33 MHz, 50 MHz, 66 MHz, 75 MHz, 100 MHz or higher. A DMII connection providing four bits of data at 50 MHz in a full-duplex mode provides 400 Mbps of bandwidth between the network devices, which is a significant improvement over a 100 Mbps Ethernet connection. The DMII connection reduces cost by eliminating the PHY devices normally required in a medium dependent connection. Also, bandwidth is not fixed, but is adjustable and may be increased by increasing the MII clock signal frequency.

In one embodiment, the crossover connection is implemented with a crossover cable for crossing the MII transmit and receive signals. In another embodiment, the crossover connection is implemented within the DMII port. An internal crossover connection enables a DMII connection to be made with another network device via a standard MII cable. Several of the MII signals, such as MII collision, carrier sense and management signals, are not needed to complete a DMII connection according to the present invention and thus are grounded. A grounding circuit is provided within the DMII port, or is provided externally and within a crossover cable, to ground the unnecessary MII signals. The clock circuit may also be provided within the crossover cable, enabling a DMII connection between two network devices with MII ports.

The network device may also include a second DMII connection having a second data link circuit, a second connector, a second crossover connection and a second clock circuit to enable daisy chaining of multiple network devices. In this manner, any number of network devices with two or more DMII ports may be daisy-chained together.

A DMII connection according to the present invention for establishing an MII connection between two network devices includes a first MII port of a first network device including MII transmit and receive signals, a second MII port of a second network device including MII transmit and receive signals, a crossover connection that couples the transmit signals of the first MII port to receive signals of the second MII port and that couples receive signals of the first MII port to transmit signals of the second MII port, and at least one clock circuit that asserts at least one clock signal on the crossover connection to synchronize data transfer between the first and second ports. The clock and grounding circuits may be provided in either or both ports, or within a crossover cable. A crossover cable and associated connectors may be implemented according to MII standards, or may be implemented in minimum or reduced configurations. A crossover adapter is also contemplated to implement the crossover connection and to interface a standard MII cable.

A DMII connection may be implemented in a computer system using a NIC card with a DMII port according to the present invention. The NIC is plugged into the slot of a peripheral bus on the motherboard of the computer. The NIC includes data link circuitry coupled to the DMII port for sending and receiving MII data to another network device, which may be another computer or any other type of network device, such as a repeater, switch, bridge, etc. The DMII port includes a connector for coupling to a crossover cable as previously described. The clock circuit may be provided externally, or may be incorporated within the DMII port of the NIC.

It is appreciated that a DMII connection according to the present invention provides an improved connection between network devices by eliminating the PHY devices normally required for medium dependent connections. Furthermore, the bandwidth may be increased simply by increasing the clock frequency of the MII clock signals.

BRIEF DESCRIPTION OF THE DRAWINGS

A better understanding of the present invention can be obtained when the following detailed description of the preferred embodiment is considered in conjunction with the following drawings, in which:

FIG. 3 is a table illustrating standard contact assignments of a standard MII cable and connector;

FIG. 7 is a diagram illustrating a twisted pair, reduced profile DMII connection;

DETAILED DESCRIPTION OF THE PREFERRED EMBODIMENT

Figure 1:
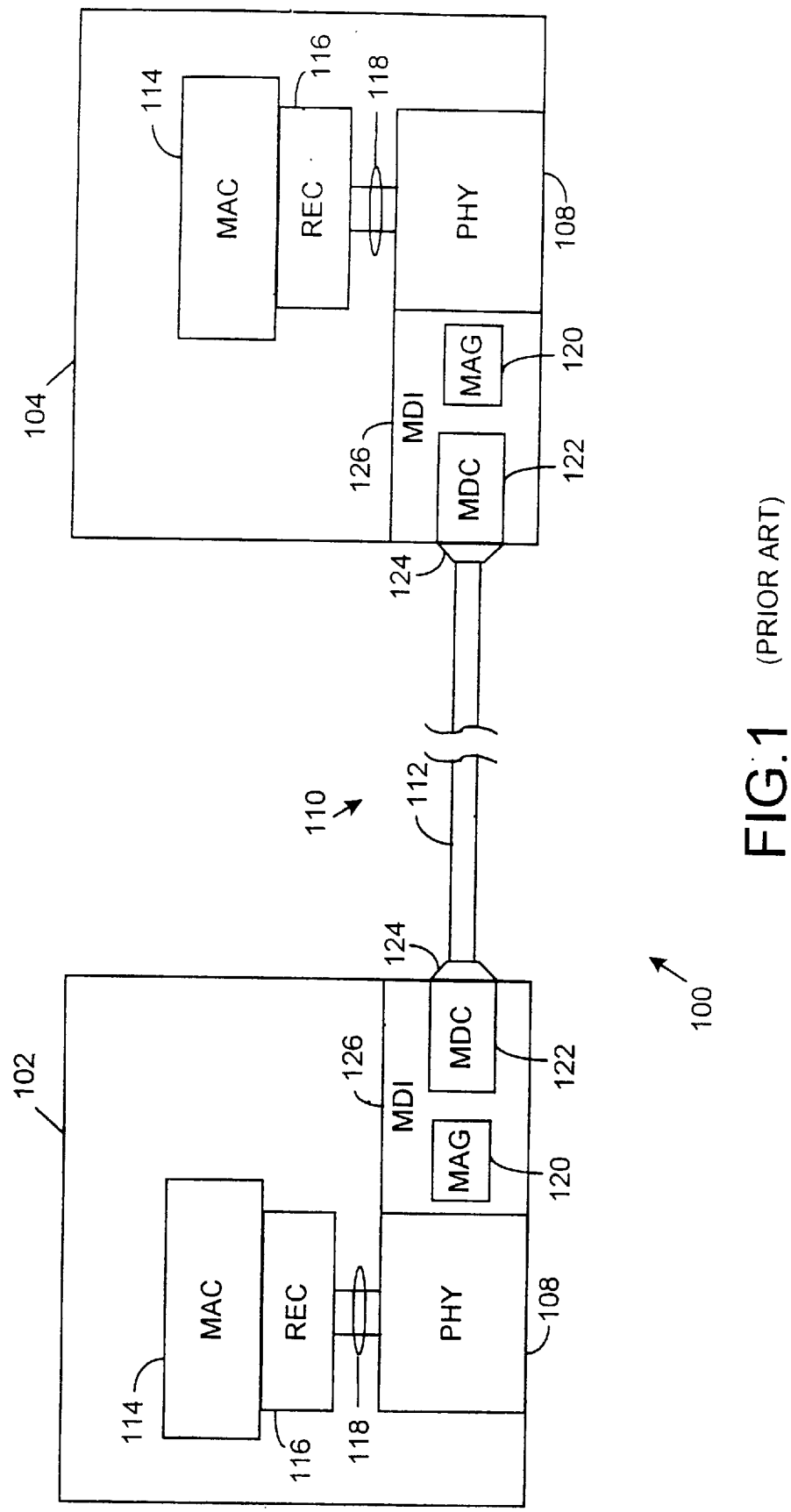
FIG. 1 is a block diagram illustrating a standard media dependent network connection between network devices in a LAN CSMA/CD implementation.

FIG. 1 is a block diagram showing a standard network connection 100 between a first network device 102 and a second network device 104 according to one embodiment of a LAN CSMA/CD implementation. The first network device 102 includes a media access controller (MAC) 114 coupled to a Reconciliation sublayer circuit (REC) 116, which is further coupled to a physical layer entity device (PHY) 108 via a media independent interface (MII) 118. A medium dependent interface (MDI) 126 is further coupled to the PHY 108. The second network device 104 also includes a MAC 114, a REC 116, an MII 118, an MII connection 124, a PHY 108, and an MDI 126 coupled together in the same manner. The MAC 114, REC 116, MII 118, PHY 108 and MDI 126 of the first network device 102 operate in a similar manner as the MAC 114, REC 116, MII 118, PHY 108 and MDI 126, respectively, of the second network device 104.

In each network device 102 and 104, the MAC 114 performs all MAC sub-layer functions. The REC 116 implements the Reconciliation sublayer to perform a mapping function that reconciles the signals of the MII 118 to the MAC-PLS (Physical Signaling Sublayer) service primitives defined in clause 6 of the IEEE 802.3 Standards, which are incorporated herein by reference. The MAC 114, REC 116, MII 118, PHY 108 and MDI 126 operate in accordance with the IEEE 802.3 Standards.

The MII 118 is generally considered optional in a LAN CSM/CD implementation, and provides a transparent interface at the bottom of the Reconciliation sublayer for transferring data between the REC 116 and the PHY 108. The MII 118 is typically designed to support a 10 Mbps data rate, a 100 Mbps data rate or both. The MII 118 may conform to Transistor—Transistor Logic (TTL) or may be implemented with digital CMOS ASIC processes, so that the MII 118 usually operates at either five (5) volts or 3.3 volts.

The PHY 108 contains the functions that transmit, receive, and manage the encoded signals that are impressed on and recovered from a selected physical medium. In the embodiment shown, the MDI 126 includes a medium dependent connector (MDC) 122 and may include compensating magnetics (MAG) 120. Together, the REC 116, the MII 118, the PHY 108 and the MDI 126 perform the functions associated with the Physical Layer of the OSI Reference Model.

A physical medium 110 includes an appropriate cable 112 and a medium dependent connector 124 attached at each end. The connectors 124 are configured to physically mate with the MDC 122 of the first and second network devices 102 and 104. The cable 112 may comprise a coaxial cable, twisted pair cable, shielded twisted pair cable, ribbon cable, fiber optic cable or any other type of known cable compatible with the particular PHY 108. Each connector 124 and each MDC 122 are implemented in one of many known configurations depending upon the cable 112, such as a connector/plug pair according to the RJ-45 or RJ-11 standards or the RS-232 standard, or any other suitable connection such as BNC connectors, fiber-optic connectors, etc. The MAG 120 compensates for transmission characteristics of the cable 112, such as series inductance, shunt capacitance and attenuation to increase the performance of the physical medium 110 between the first network device 102 and the second network device 104.

Data communication between the network devices 102, 104 complies with the particular physical medium 110 and the network protocol implemented, e.g. 10 Mbps Ethernet, 100 Mbps Ethernet, Token Ring, ATM, etc., and thus in a medium dependent format. Bidirectional operation may occur in a simplex mode, half-duplex mode or full-duplex mode depending upon chosen operation. Depending upon the implementation and network traffic requirements, the combination of the PHYs 108, the MDIs 126 and the physical medium 110 between the network devices 102 and 104 may not provide sufficient bandwidth to service the flow of network data between the network devices 102 104. The combination of these elements may create a bottleneck in the network thereby reducing network performance. Although newer and faster protocols are being developed, such newer protocols may require complete replacement of existing network devices, hardware devices and cables. Even the cost of replacing the PHYs 108 and the MDIs 126 is relatively expensive.

The MII 118 may be provided externally in some configurations to allow the user a choice of the physical medium for a given network device. For example, a repeater may include a standard, external, MII connector for interfacing with an external PHY device. In this manner, any desired medium and network protocol supported by the external PHY device may be employed without modification of the repeater. The PHY device also includes a standard MII connector, and the connection is completed using a standard, straight-through MII cable with corresponding MII connectors at each end. The standard MII connectors and cables are defined in the IEEE 802.3 Standards. The standard MII cable provides straight through connections of each of the MII signals. Although this configuration provides greater flexibility in that the user may select any appropriate physical medium to complete the connection, the communication protocol and structure is essentially the same and dependent on whatever physical medium is selected.

Figure 2:
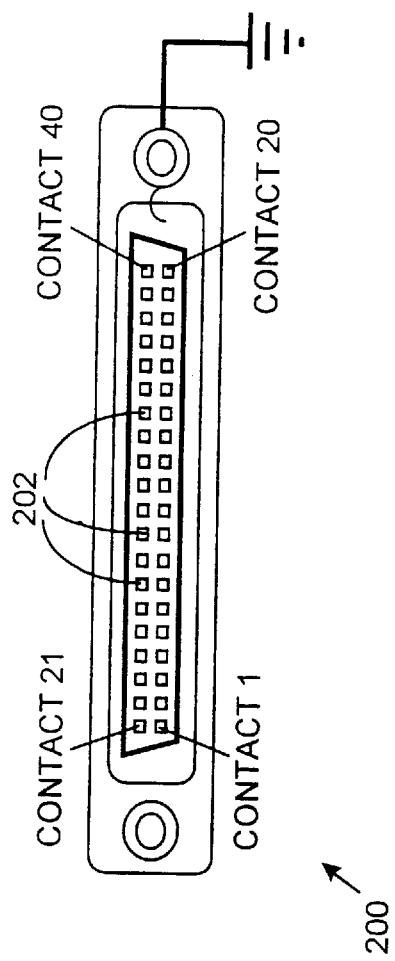
FIG. 2 is a diagrammatic end view of a standard MII connector.

FIG. 2 is a diagrammatic end view of a standard MII connector 200 according to the IEEE 802.3 Standards. The MII connector 200 is a DB-40 connector of male or female construction, including 40 contacts 202 numbered 1 through 40 as shown. The contacts 202 are sockets for the female construction or pins for the male construction. The MII connector 200 is organized so that contacts 1–20 are aligned in a first row and contacts 21–40 are aligned in a parallel, second row.

FIG. 3 is a table 300 illustrating the contact assignments of a standard MII cable and of the MII connector 200 shown in FIG. 2 according to the IEEE 802.3 Standards. Each of the RECs 116 provide a regulated power supply for use by the associated PHY 108, where each power supply uses four +5.0 volt (V) signals on the corner contacts 1, 20, 21 and 40, and 18 return signals, each referred to as a COMMON signal, on contacts 22–39. The +5V power signals may operate at other standard voltage levels, such as 3.3 or 2.2 volts, for example. The remaining MII signals, described below, are provided on the remaining contacts 2–19. In this manner, each MII signal is aligned with a corresponding COMMON contact, which is a return path dedicated to that signal. In the standard MII cable constructed in accordance with IEEE 802.3 Standards, each MII signal wire is twisted together with its aligned COMMON signal wire counterpart forming an individual twisted-wire pair. All of the twisted pairs form a bundle of conductors, which are collectively wrapped in an overall shield covering the cable bundle.

The MII signals are now described with reference to FIG. 3, where a more complete definition of the described signals is found in the IEEE 802.3 Standards. A Management Data Input/Output (MDIO) signal (contact 2) is bi-directional signal between the PHY device and a station management entity (STA) (not shown) in the network. It is used to transfer control information and status between the PHY and the STA. The STA manages a respective node's activity and also allocates the architecture's bandwidth as required. There are three elements to the STA: (1) Frame services generate frames for diagnostics; (2) Connection management controls access to the network; and (3) Ring management (RMT) troubleshoots the network. If there is a fault in the primary ring, the STA entity redirects transmissions to use the secondary ring around the faulty section. This component has no counterpart in the OSI Reference Model and its capabilities may be implemented in hardware or software.

A Management Data Clock (MDC) signal (contact 3) is a bi-directional signal between the PHY and the STA. The MDC signal provides a timing reference for transfer of information on the MDIO signal. The MDC signal has no maximum high or low times and is not required in non-FDDI networks. Control information is driven by the STA synchronously with respect to the MDC signal and is sampled synchronously by the PHY device. Status information is driven by the PHY device synchronously with respect to the MDC signal and is sampled synchronously by the STA.

A Collision (COL) signal (contact 18) is asserted upon detection of a collision on the physical medium. Collisions are determined in accordance with the network architecture employed. A Carrier Sense (CRS) signal (contact 19) is asserted whenever the transmit or receive physical medium is not idle, but is otherwise de-asserted. A connected PHY ensures that the CRS signal remains asserted though the duration of a collision condition. As will be described more fully below, the MDIO, MDC, COL and CRS signals are not required for a connection according to the present invention.

Receive Data (RX) signals RXD<3>, RXD<2>, RXD<1> and RXD<0> (contacts 4–7), collectively referred to as the RXD<3:0> signals, define a four bit bus for receiving a nibble of MII data. The RXD<3:0> signals transition synchronously with a Receive Clock (RX_CLK) signal (contact 9), which is a periodic clock signal that provides a timing reference for the RXD<3:0> signals, a Receive Data Valid (RX_DV) signal (contact 8) and a Receive Error (RX_ER) signal (contact 10). The RX_DV signal indicates that nibbles of data are valid on the RXD<3:0> signals. The RX_DV signal transitions synchronously with respect to the RX_CLK signal, remains asserted continuously from the first nibble of a data frame through the final recovered nibble and is negated prior to the first RX_CLK signal period that follows the final nibble. The RX_ER signal is asserted for one or more RX_CLK signal periods while the RX_DV signal is asserted to indicate that a transmission error has been detected somewhere within the data frame currently being transmitted. With the RX_DV signal de-asserted, the RX_ER signal has no effect.

Transmit Data (TX) signals TXD<3>, TXD<2>, TXD<1> and TXD<0> (contacts 17–14), collectively referred to as the TXD<3:0> signals, define a four bit bus for transmitting a nibble of MII data. The TXD<3:0> signals transition synchronously with a Transmit Clock (TX_CLK) signal (contact 12), which is a periodic clock signal that provides a timing reference for the TXD<3:0> signals, a Transmit Enable (TX_EN) signal (contact 13) and a Transmit Error (TX_ER) signal (contact 11). The TX_EN signal indicates whether data is valid on the TXD<3:0> signals. The TX_EN signal is asserted synchronously with the first four bits of the preamble of a data packet and remains asserted while all of the data packet is presented. The TX_ER signal is asserted for one or more TX_CLK signal periods while the TX_EN signal is asserted to indicate that a transmission error has been detected within the data currently being transmitted. It is noted that the TX_EN and RX_DV signals are referred to as frame delimiter signals.

Figure 4A:
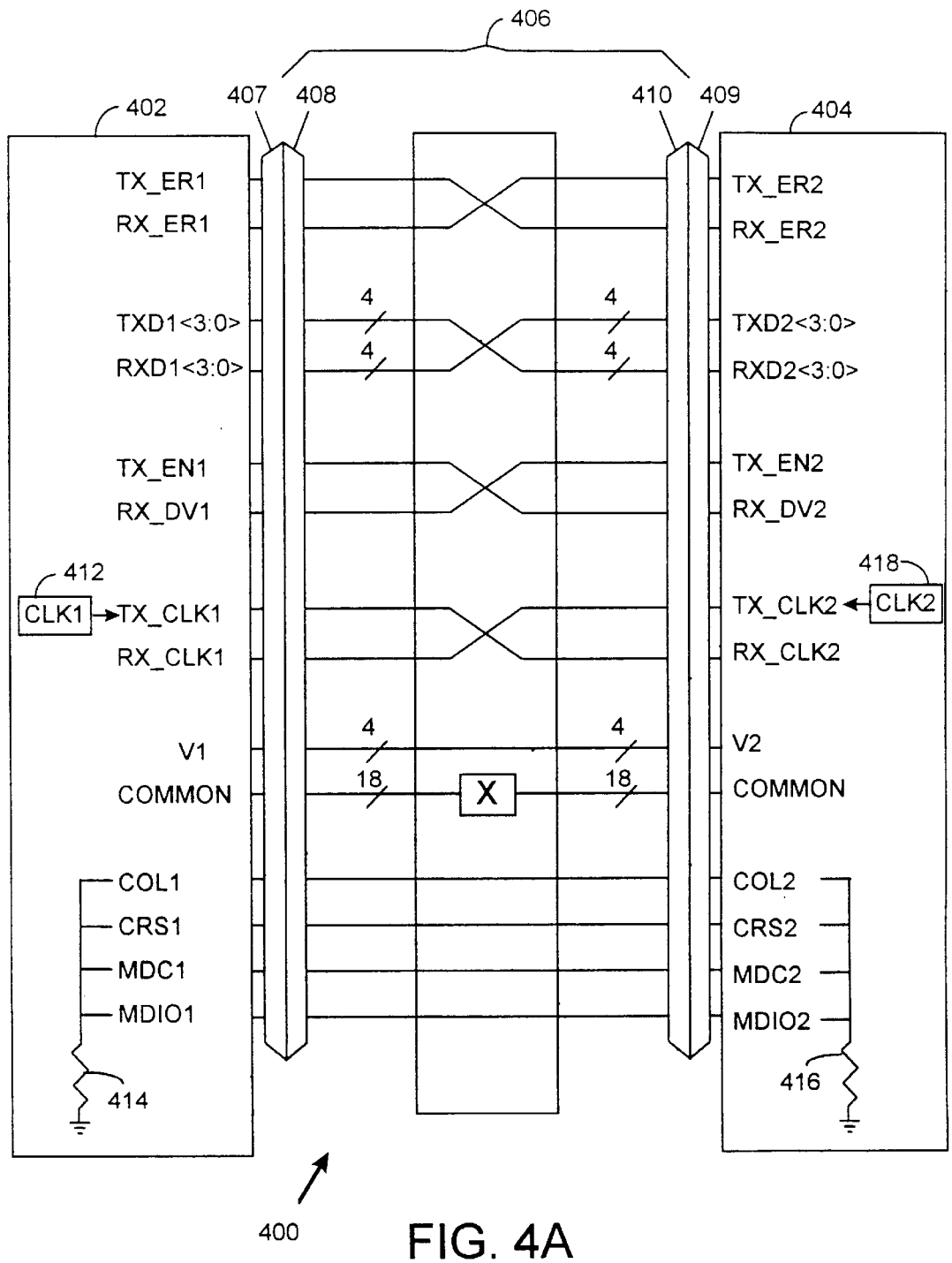
FIG. 4A is a diagram illustrating an embodiment of a direct media independent interface (DMII) connection according to the present invention.

FIG. 4A is a diagram illustrating a direct media independent interface (DMII) connection 400 between two network devices according to one embodiment of the present invention. The DMII connection 400 includes a DMII port 402 of a first network device, a DMII port 404 of a second network device, and a crossover cable 406. Although not shown, each of the network devices include MAC and REC devices coupled to the DMII ports 402 and 404 for transmitting and receiving MII signals. The network devices are any type of network devices previously described, such as repeaters, bridges, switches, etc., or a computer system including a network interface card (NIC) for attachment to a network. The DMII ports 402, 404 each include the same MII signals described above, except that the signal names of the respective ports include a suffix 1 or 2 indicating the respective DMII port 402 or 404. Also, the +5V signals are collectively referred to as signals V1 and V2 for the respective DMII ports 402 and 404.

The DMII port 402 optionally includes a grounding circuit 414, which is coupled to ground for pulling the COL1, CRS1, MDC1 and MDIO1 signals of the DMII port 402 to ground. The grounding circuit 414 may be implemented in any appropriate fashion, such as one or more pull-down resisters. For an embodiment using resistive elements, a single resistor may suffice or a separate resistor may be provided for each signal pulled low. Also, some of the signals, such as the COL and CRS signals, need not be pulled low and may be left floating. The DMII port 402 also includes a clock circuit 412 for asserting a clock signal CLK1 on the TX_CLK1 signal of the DMII port 402. Likewise, the second port 404 optionally includes a grounding circuit 416 coupled to ground for pulling the COL2, CRS2, MDC2 and MDIO2 signals of the DMII port 404 to ground. The grounding circuit 416 is implemented in a similar manner as the grounding circuit 414, such as one or more pull-down resistors or the like. The DMII port 404 also includes a clock circuit 418 for asserting a clock signal CLK2 on the TX_CLK2 signal of the DMII port 404.

The first port 402 includes a connector 407 for mating with a compatible connector 408 on one side of the crossover cable 406. The second port 404 includes a connector 409 for mating with a compatible connector 410 on the other side of the crossover cable 406. The connectors 407, 408, 409 and 410 are standard MII DB-40 connectors, with any desired male/female configuration as desired. For example, if the connectors 407 and 409 are standard MII female-type connectors, then the connectors 408 and 410 are standard MII male-type connectors, and vice-versa.

The crossover cable 406 couples the MII signals of the DMII port 402 to counterpart MII signals of the DMII port 404 in crossover fashion according to the present invention. In particular, each transmit signal of one DMII port is connected to the corresponding receive signal of the other DMII port and vice-versa, as summarized in the following Table 1:

TABLE 1

Crossover Connections

| DMII port 402 | DMII port 404 |
| --- | --- |
| TX_ER1 | RX_ER2 |
| RX_ER1 | TX_ER2 |
| TXD1<3> | RXD2<3> |
| TXD1<2> | RXD2<2> |
| TXD1<1> | RXD2<1> |
| TXD1<0> | RXD2<0> |
| RXD1<3> | TXD2<3> |
| RXD1<2> | TXD2<2> |
| RXD1<1> | TXD2<1> |
| RXD1<0> | TXD2<0> |
| TX_EN1 | RX_DV2 |
| RX_DV1 | TX_EN2 |
| TX_CLK1 | RX_CLK2 |
| RX_CLK1 | TX_CLK2 |

The V1 and V2 signals of the DMII ports 402 and 404 are not crossed but are coupled to each other as described above. Each COMMON signal is coupled to a COMMON signal of the other port through the crossover cable 406. The corresponding COMMON signals are optionally coupled in crossover fashion based on the signal each is paired with, as indicated by the "X" symbol in the crossover cable 406 in FIG. 4A. For example, the COMMON signal for the TX_ER1 signal of the DMII port 402 is coupled to the COMMON signal for the RX_ER2 signal of the DMII port 404, while the COMMON signal for the TX_ER2 signal of the DMII port 404 is coupled to the COMMON signal for the RX_ER1 signal of the DMII port 402. The COL1, CRS1, MDC1 and MDIO1 signals are connected to the COL2, CRS2, MDC2 and MDIO2 signals, respectively. However, the COL, CRS, MDC and MDIO signals are not necessary for the DMII connection 400 according to the present invention, and are thus pulled to ground.

The RX_CLK and TX_CLK clock signals are both typically provided by a respective PHY device coupled thereto. However, because the PHY devices and the associated physical medium are eliminated, the clock signals are provided internally by the clock circuits 412 and 418 of the DMII ports 402 and 404, respectively. The clock circuit 412 asserts the CLK1 signal as the TX_CLK1 signal of the DMII port 402 and as the RX_CLK2 signal of the DMII port 404 via the crossover cable 406. Likewise, the clock circuit 418 asserts the CLK2 signal as the TX_CLK2 signal of the DMII port 404 and as the RX_CLK1 signal of the DMII port 402 via the crossover cable 406.

The DMII connection 400 is effectively transparent to the MAC and REC devices of each of the network devices, so that the MAC/REC devices operate as if they were coupled through respective PHY devices and a physical medium. However, the DMII connection 400 optionally has a higher bandwidth than that of a standard PHY and MDI combination that is typically used. Thus, the DMII connection 400 eliminates the costly PHY devices, the MDI devices and replaces the typical physical medium with an MII or DMII cable. Further, the DMII connection 400 allows increased bandwidth between the network devices by increasing the frequency of the CLK1 and CLK2 clock signals, as described below.

In one embodiment, the crossover cable 406 is constructed according to IEEE 802.3 Standards as described previously, where each MII signal is twisted with a COMMON signal counterpart forming a bundle of twisted pairs with an overall shield, except that the crossover function is also incorporated. For example, the TXD1<3> signal is twisted together with its COMMON signal counterpart and connected to the RXD2<3> signal and its COMMON signal counterpart, while the TXD2<3> signal is twisted together with its COMMON signal counterpart and connected to the RXD1<3> signal and its COMMON signal counterpart. The crossover cable 406 has a relatively low series impedance and shunt capacitance and is shielded from noise so as to minimally degrade signals passing between the DMII ports 402 and 404.

The frequency of the CLK1 and CLK2 signals are preferably the same as each other. The maximum frequency depends upon the frequency capability of the MAC and REC devices of both network devices and the length and transmission characteristics of the crossover cable 406. A standard clock frequency of 25 megahertz (MHz) provides a bandwidth of 200 Mbps in a full duplex mode, which is the same data rate as a 100 Mbps Ethernet connection, but at reduced cost since the Ethernet PHY devices are eliminated. The frequency is increased to increase bandwidth. For example, at frequencies of 33, 50, 66 or 100 MHz for both the CLK1 and CLK2 signals, the DMII connection 400 provides a corresponding full duplex data rate of 264, 400, 528 or 800 Mbps, respectively. The MAC and REC devices of both network devices must be capable of operating at the chosen clock frequency or data rate.

In alternative embodiments, the crossover cable is implemented as a ribbon cable, an unshielded bundle or any other physical construction that would facilitate the DMII connection 400. In many configurations, such as stacked network switches located adjacent each other, the DMII connection 400 may be operated with a relatively high clock frequency since the crossover cable 406 is very short. Furthermore, compensating components are added at the DMII ports 402 and 404 in any of these embodiments to allow a longer crossover cable 406 by enhancing its transmission line characteristics. Also, the DMII ports 402 and 404 may be customized with higher drive voltages to enable even longer DMII connections between devices in other embodiments according to the present invention.

Figure 4B:
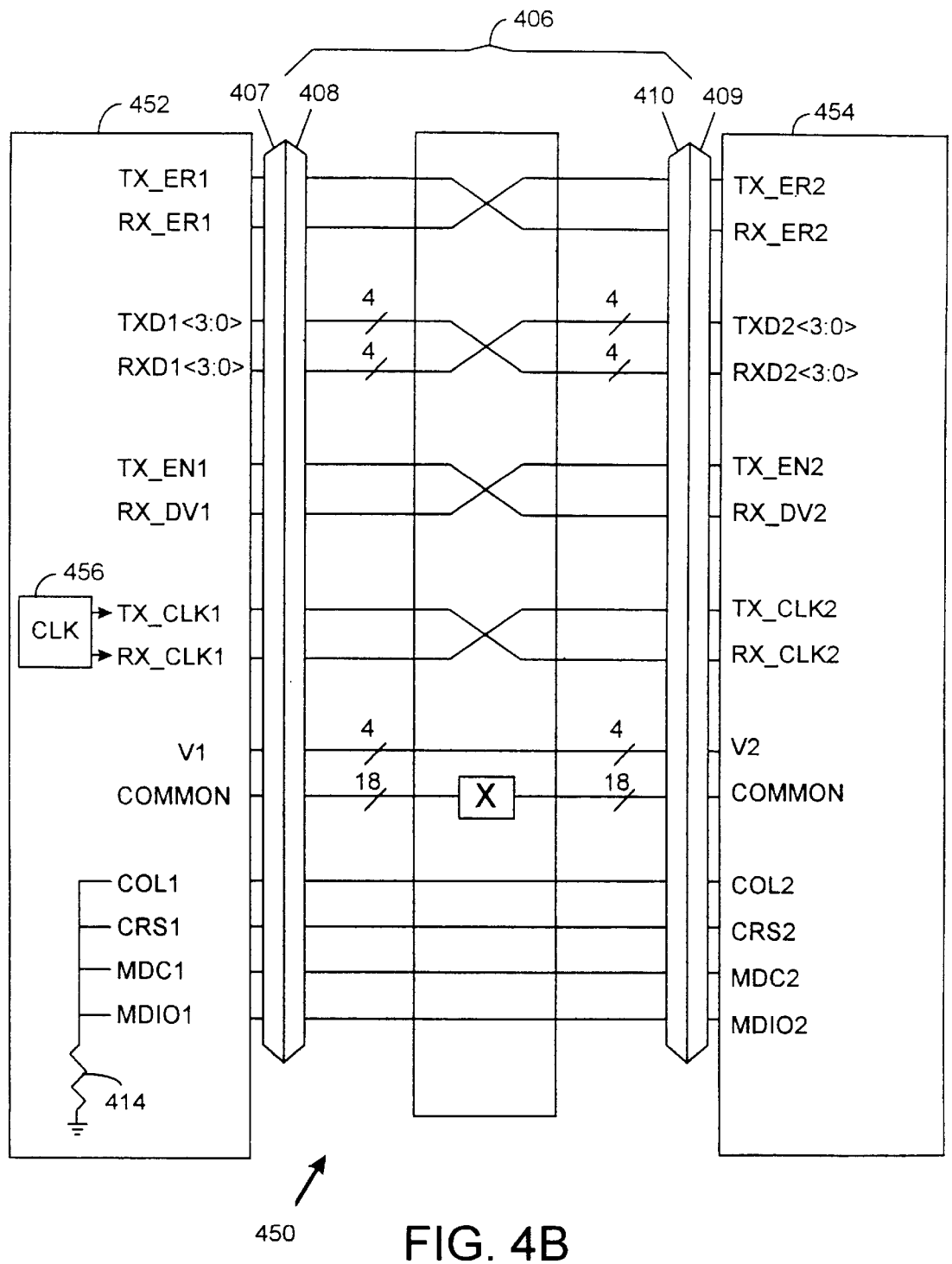
FIG. 4B is a diagram illustrating an alternative embodiment of a DMII connection according to the present invention including an MII port.

FIG. 4B is a diagram illustrating a DMII connection 450 according to an alternative embodiment of the present invention. For the DMII connection 450, a first network device includes a DMII port 452 according to the alternative embodiment of the present invention, which is coupled to an MII port 454 of a second network device via the crossover cable 406. Again, although not shown, each of the network devices include MAC and REC devices coupled to the ports 452 and 454 for transmitting and receiving MII signals. The signal names are the same as described above for FIG. 4A, and similar components assume identical reference numerals. The crossover cable 406 is the same, so that the connection is made with standard MII connectors 407, 408, 409 and 410 as before. Also, the crossover connections are the same as that described above for FIG. 4A.

However, the MII port 454 does not include a separate clock circuit. A clock circuit 456 in the DMII port 452 provides both the TX_CLK1 and RX_CLK1 signals, which signals are also provided to the TX_CLK2 and RX_CLK2 signals of the MII port 454 via the crossover cable 406. A single clock signal CLK is provided to both of the TX_CLK1 and RX_CLK1 signals, although separate clock signals could also be generated. In this manner, the clock circuit 456 provides all clocking functions for the DMII connection 450 to enable network communication between the network devices. The maximum frequency of the CLK signal provided by the clock circuit 456 depends upon the length and transmission characteristics of the crossover cable 406, where, as before, the frequency of CLK signal is chosen to select the desired bandwidth of the DMII connection 450. For example, the CLK signal may have a frequency of 25, 33, 50, 66, 100 MHz or higher.

The DMII port 452 includes the grounding circuit 414 coupled to ground to pull the COL1, CRS1, MDC1 and MDIO1 signals to ground as previously described. The COL2, CRS2, MDC2 and MDIO2 signals are grounded by the grounding circuit 414 via the crossover cable 406. The embodiment of FIG. 4B illustrates that a DMII connection according to the present invention is possible with a network device having an external MII port, such as the MII port 454.

Figure 4C:
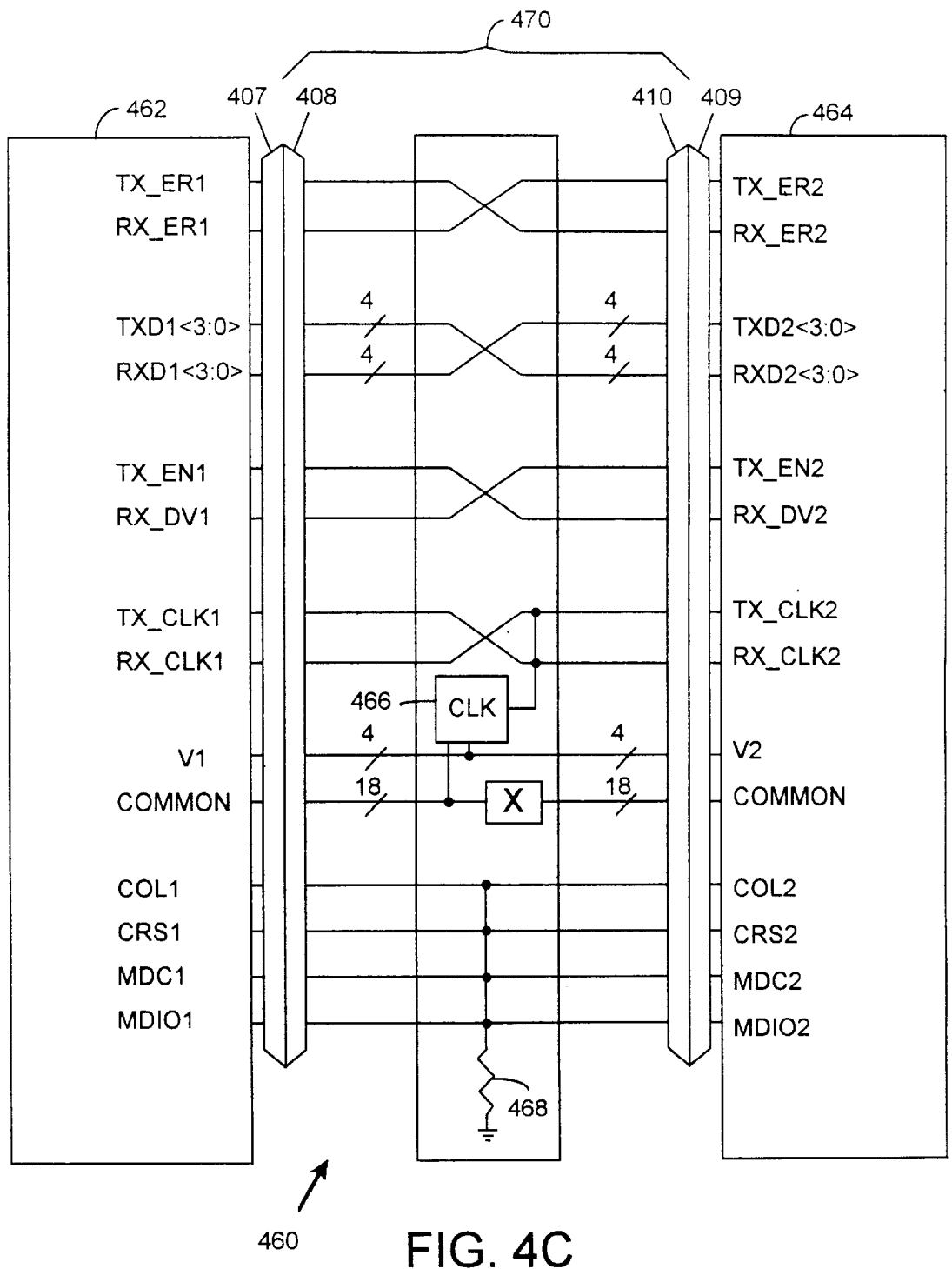
FIG. 4C is a diagram illustrating another alternative embodiment of a DMII connection according to the present invention including two MII ports.

FIG. 4C is a diagram illustrating another alternative embodiment of a DMII connection 460 according to the present invention. Again, similar components assume identical reference numerals. The DMII connection 460 includes an MII port 462 of a first network device, an MII port 464 of a second network device and a crossover cable 470. As before, each of the network devices include MAC and REC devices coupled to the ports 462 and 464 for transmitting and receiving MII signals. The crossover cable 470 includes the standard MII connectors 408, 410 and provides the same connections and crossover functions as the crossover cable 406. However, the crossover cable 470 further includes a clock circuit 466 and a grounding circuit 468. The clock circuit 466 operates in a similar as the clock circuit 456 for providing at least one clock signal CLK to the TX_CKL1/RX_CLK2 signals and the TX_CLK2/RX_CLK2 signals. The clock circuit 466 derives power from the V1/V2 power signals referenced to the COMMON signals. Alternatively, the ground for the clock circuit 466 may be a chassis ground, shield ground or any other ground provided for the crossover cable 470. The grounding circuit 468 couples the COL1/COL2, CRS1/CRS2, MDC1/MDC2 and MDIO1/MDIO2 signals to ground, and may be implemented with one or more pull down resistors or the like as previously described. While the clock circuit 466 and the grounding circuit 468 are shown located within the crossover cable 470, they may alternatively reside at any other convenient location, such as within an external device attachable to the crossover cable 470.

FIG. 4C illustrates that a DMII connection 460 according to the present invention is achievable between network devices having MII ports. Thus, network devices with MII ports need not be modified.

Figure 4D:
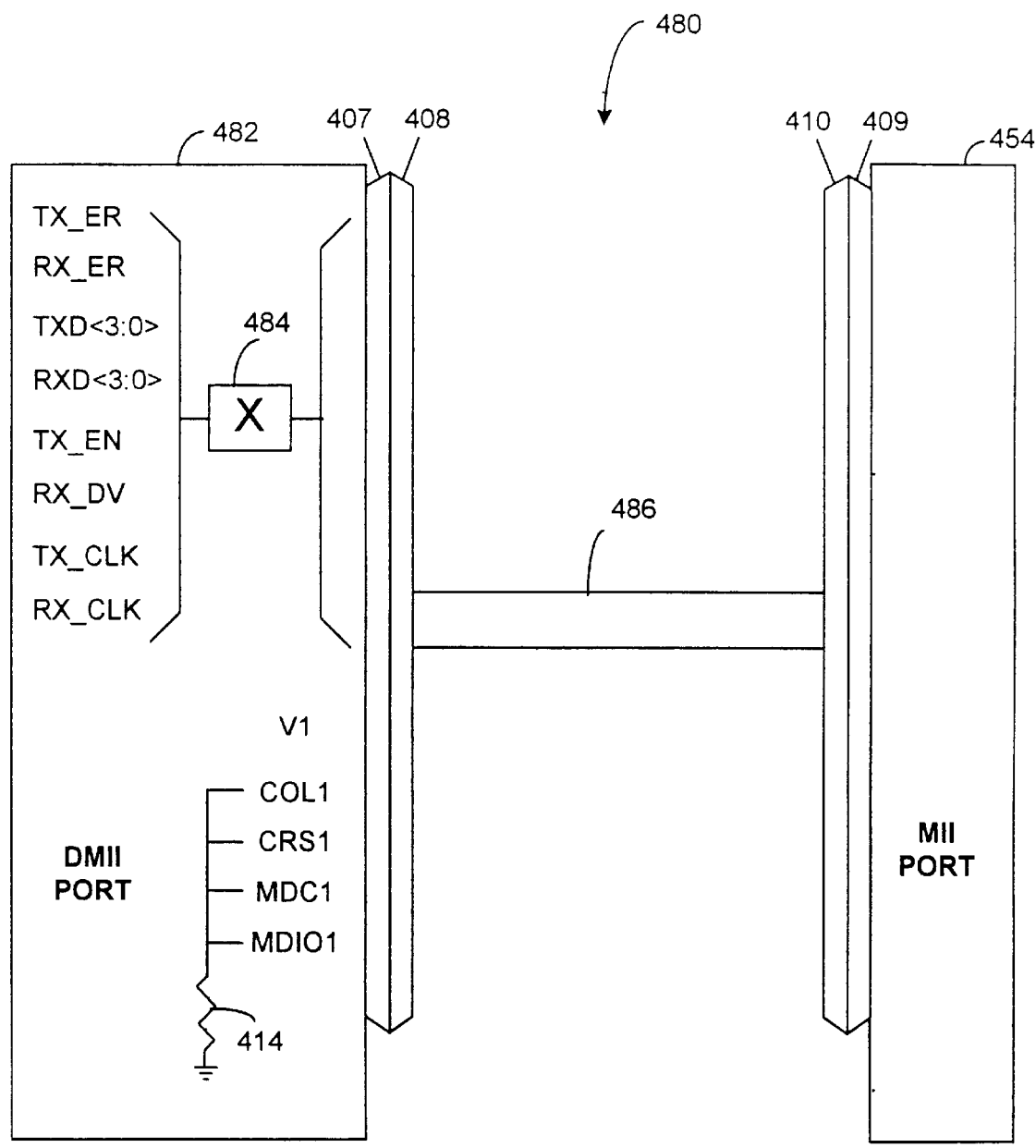
FIG. 4D is a diagram illustrating yet another alternative embodiment of a DMII connection according to the present invention including an MII port and standard MII cable.

FIG. 4D is a diagram illustrating a DMII connection 480 according to yet another alternative embodiment of the present invention. The DMII connection 480 is similar to the DMII connection 450, except that the DMII port 452 of the first network device is replaced with a DMII port 482 with an internal crossover connection 484. The clock circuit 456 is included to assert the TX_CLK1 and RX_CLK1 signals as previously described. The COMMON signals may be crossed within the crossover connection 484, or may simply be paired in the connector 407 without being crossed. The first network device includes MAC and REC devices coupled to the DMII port 482 for transmitting and receiving MII signals. The second network device includes the MII port 454. The crossover connection 484 performs a similar crossover function as performed in the crossover cables described previously, such as the crossover cable 406, where the MII transmit and receive signals are crossed as shown in Table 1. The DMII connection 480 is completed using a standard MII cable 486 with straight-through MII connections.

Figure 5:
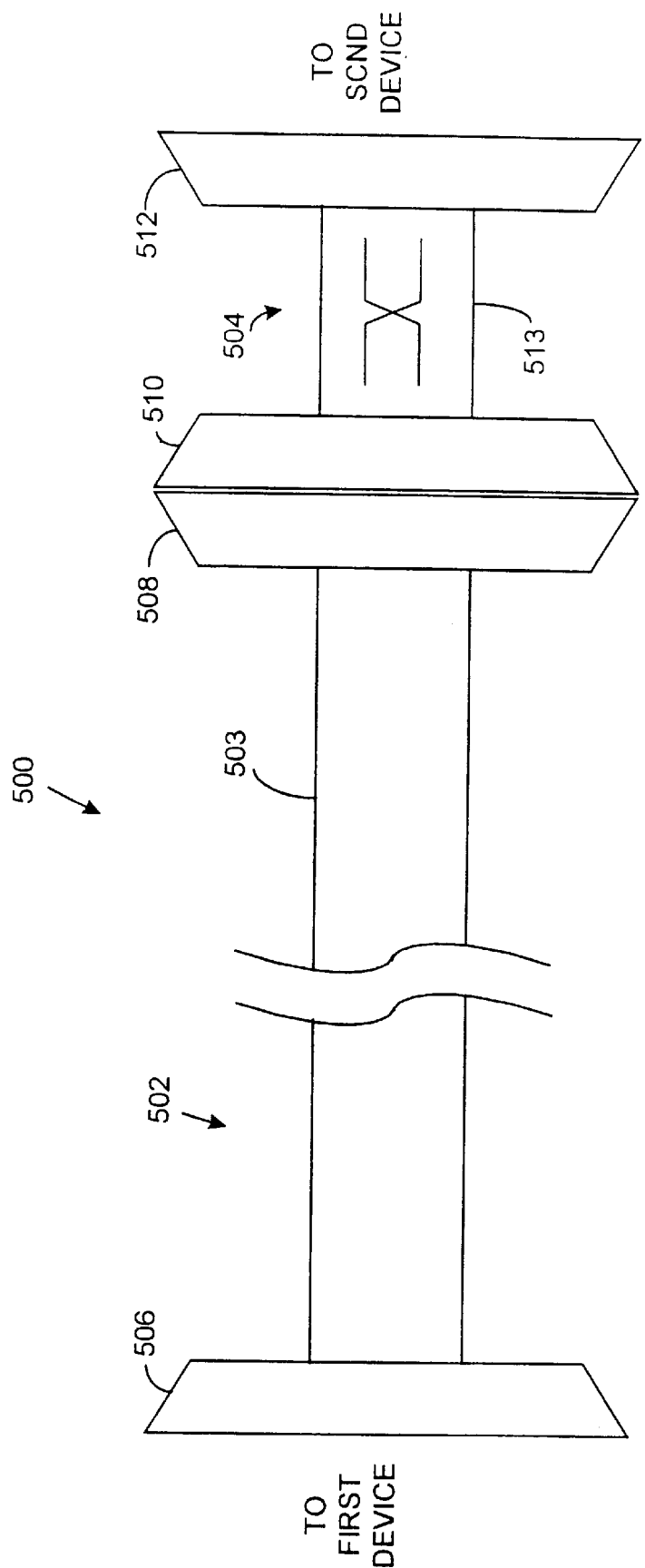
FIG. 5 is a diagram illustrating an embodiment of a crossover cable for completing a DMII connection according to the present invention.

FIG. 5 is a diagram illustrating an embodiment of a crossover cable 500 for completing a DMII connection according to the present invention, where the crossover cable 500 includes both a standard MII cable 502 and a DMII adapter 504. The standard MII cable 502 is a DB-40 cable including standard MII connectors 506, 508 connected to either end of a cable segment 503. The cable segment 503 is implemented as a shielded bundle according to a standard MII cable. Alternatively, the cable segment 503 is implemented as a ribbon cable, an unshielded bundle or any other cable type that provides the appropriate MII connections. One of the connectors 506 or 508 is coupled to the DMII adapter 504, while the other is coupled to an MII or DMII port of a network device.

The DMII adapter 504 includes standard MII connectors 510, 512 on either end of a crossover segment 513. One of the connectors 510 or 512 is coupled to the standard MII cable 502, while the other is coupled to an MII or DMII port of another network device. The crossover segment 513 performs the same crossover function as the crossover cables 406 or 470. The crossover segment 513 is implemented in a similar manner as the crossover cable 406 when either one or both of the network devices includes a DMII port according to the present invention. Alternatively, the crossover segment 513 is implemented in a similar manner as the crossover cable 470 to include the clock and grounding functions to connect two network devices with MII ports. The crossover segment 513 may be as long as desired, but is preferably a relatively short cable segment or even a solid adapter.

Figure 6A:
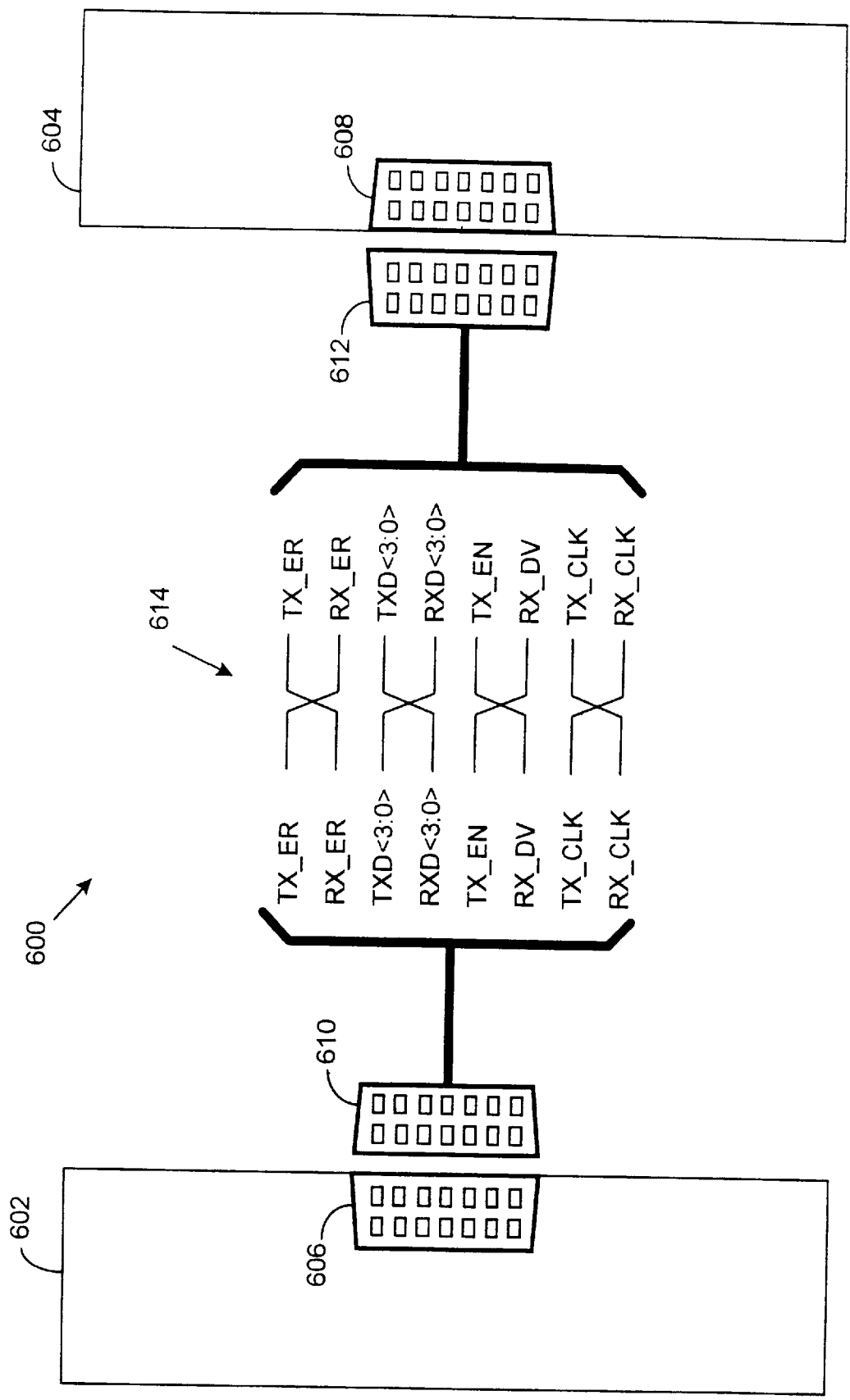
FIG. 6A is a diagram illustrating a minimum profile DMII connection according to the present invention.

FIG. 6A is a diagram illustrating a minimum profile DMII connection 600 between a port 602 of a first network device and a port 604 of a second network device. As usual, each of the network devices include MAC and REC devices (not shown) coupled to the ports 602 and 604 for transmitting and receiving MII signals. Either one or both of the ports 602, 604 is implemented as a DMII port according to the present invention. For example, both ports 602 and 604 may be implemented in a similar manner as the DMII ports 402 and 404. Alternatively, either port 602 or 604 is an MII port and the other port is implemented in a similar manner as the DMII port 452 as shown in FIG. 4B. Both ports 602 and 604 include minimum profile connectors 606 and 608, respectively, for mating with corresponding minimum profile DMII connectors 610 and 612, respectively, of a crossover cable 614. The crossover cable 614 includes the TX_ER, RX_ER, TXD<3:0>, RXD<3:0>, TX_EN, RX_DV, TX_CLK and RX_CLK signals, and performs the crossover functions of these signals as previously described in Table 1 above. The crossover cable 614 is implemented as a bundled cable, a ribbon cable or another type of cable.

The power signals, the COMMON signals and the COL, CRS, MDC and MDIO signals are not included in the minimum profile DMII connection 600 and thus are not in the crossover cable 614. Thus, the minimum profile connectors 606, 608, 610, and 612 only include a minimum number of 14 contacts and thus are smaller than the standard MII connectors. The connectors 606–612 may be implemented as DB-14 type connectors or as single-line connectors as desired. Also, the crossover cable 614 has the minimum number of 14 wires. In this manner, the minimum profile cable 614 may be manufactured at a reduced cost.

In an alternative embodiment, the cable 614 may be a minimum profile, straight-through cable, where the crossover function is provided in either one of the ports 602, 604, in a similar manner as shown in FIG. 4D.

Figure 6B:
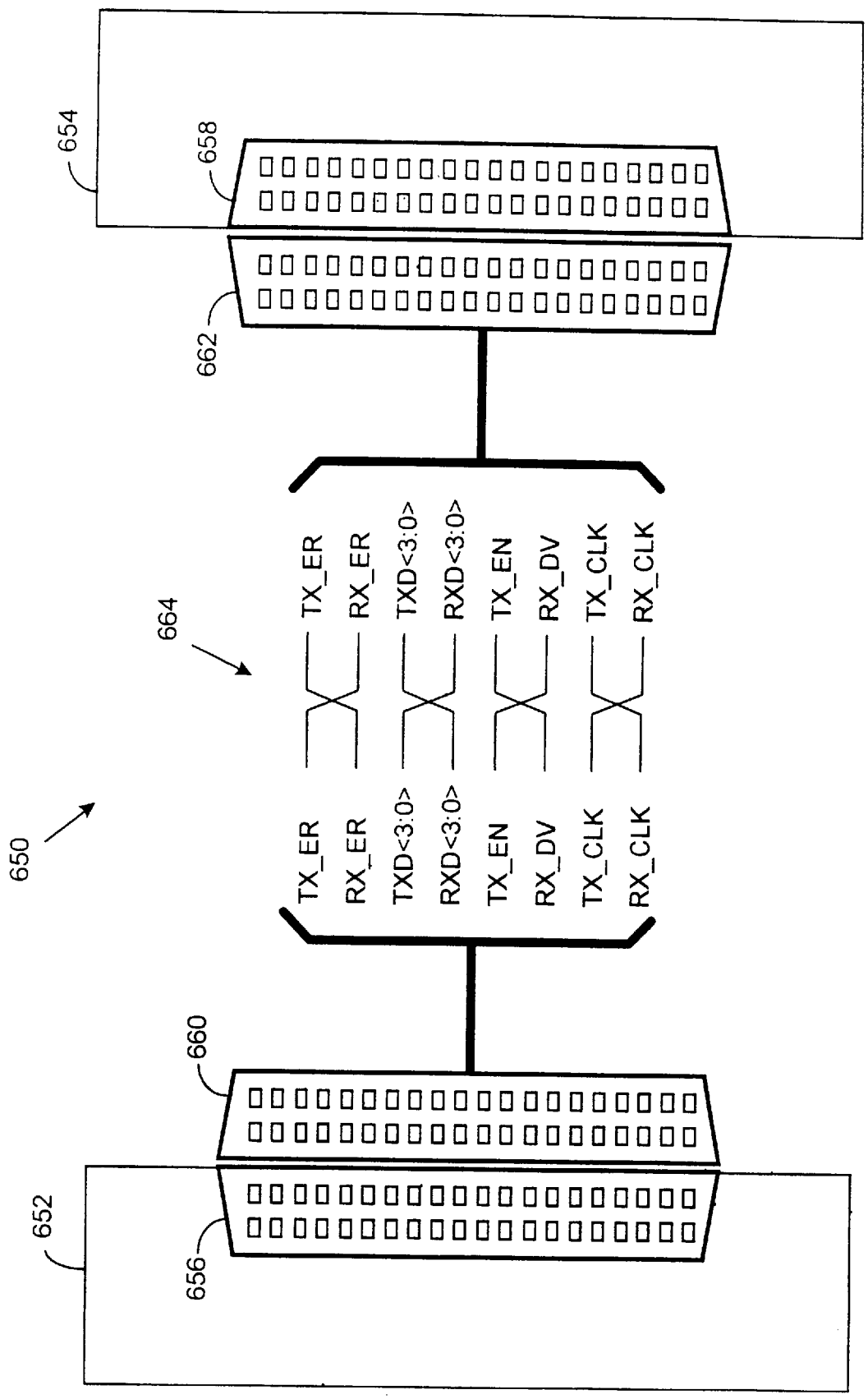
FIG. 6B is a diagram illustrating an alternative minimum profile DMII connection according to the present invention.

FIG. 6B is a diagram illustrating an alternative embodiment of a minimum profile DMII connection 650 between a port 652 of a first network device and a port 654 of a second network device. The ports 652 and 654 are implemented in a similar manner as the ports 602, 604, respectively, but include standard MII connectors 656 and 658, respectively. The minimum profile DMII connection 650 includes a crossover cable 664 that is similar to the crossover cable 614, but which includes standard MII connectors 660 and 662 for mating with the MII connectors 656 and 658, respectively. The crossover cable 664 also includes only the 14 signals described in Table 1. In this manner, the cable 664 enables a minimum profile DMII connection according to the present invention between two network devices with ports having standard MII connectors. Nonetheless, either one or both of the ports 652, 654 is a DMII port as previously described.

In an alternative embodiment, the cable 664 may be a minimum profile, straight-through cable, where the crossover function is provided in either one of the ports 652, 654, in a similar manner as shown in FIG. 4D.

FIG. 7 is a diagram illustrating a twisted pair, reduced profile DMII connection 700. The DMII connection 700 is shown for a port 702 of a network device, where the port 702 has a reduced profile connector 704 including contacts for the same 14 MII signals of Table 1 and the dedicated COMMON signal return paths for each of the 14 MII signals. The network device includes MAC and REC devices (not shown) coupled to the port 702 for transmitting and receiving MII signals. The port 700 is either an MII port or a DMII port as described above, depending upon whether the clock and grounding functions are included, where either embodiment is contemplated by the present invention. The reduced profile DMII connection 700 is completed with a reduced profile cable 706, which includes a reduced profile connector 708 for mating with the connector 704.

In this manner, the connectors 704 and 708 include 28 signal connections and the cable 706 includes 28 signal lines for 14 twisted pairs 710 to provide greater noise resistance than the minimum profile cables 614, 664. In particular, the twisted pairs 710 have reduced susceptibility to noise coupling and also have enhanced transmission capabilities as compared to non-twisted pair configurations. Thus, as compared to a ribbon cable implementations or non-twisted pair implementations, the shielded twisted pair implementation of the DMII connection 700 provides enhanced performance. Such enhanced performance allows for greater physical length of the DMII connection 700 and allows for higher clock frequencies, thereby providing greater bandwidth. The connectors 704 and 708 are shown as DB-28 connectors including a first row of 14 contacts for the signals and a second row of contacts for the COMMON signals. Alternatively, single-line reduced connectors are contemplated. Also, the connectors 704 and 708 may be implemented as standard MII connectors, although the cable 706 only includes the 14 twisted pairs. The DMII connection 700 optionally includes a shield 712 surrounding the twisted pairs 710 to provide further noise protection and greater performance.

The reduced profile cable 706 preferably performs the crossover function as previously described. Alternatively, the cable 706 is a reduced profile, straight-through cable, where the crossover function is performed within the port 702, as previously described in FIG. 4D.

The present invention further contemplates the use of high performance parallel (HPPI) cables for establishing any of the DMII connections previously described. HPPI cables are typically used in conjunction with super computer applications, and provide improved digital signal transmission properties. The HPPI cables are preferably implemented to perform the crossover function, but may be implemented as straight-through cables as well. The HPPI cables may be implemented in a similar manner to include all of the MII signals, or only the MII transmit and receive data signals, the frame delimiter signals, the transmit and receive error signals and the transmit and receive clock signals in a minimum profile configuration. Alternatively, the HPPI cable may be implemented in a reduced profile configuration to include the MII transmit and receive data signals, the frame delimiter signals, the transmit and receive error signals, the transmit and receive clock signals and the COMMON signals to provide dedicated return signal paths.

Figure 8:
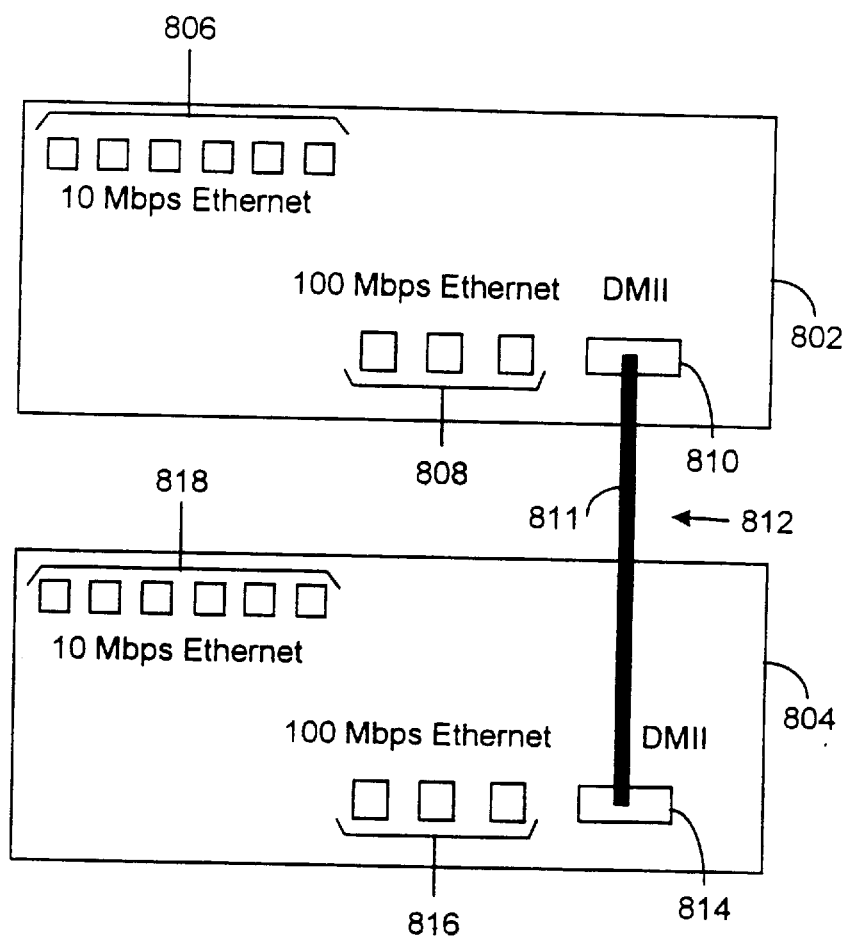
FIG. 8 is a schematic block diagram illustrating a DMII connection according to the present invention for coupling two network switches.

FIG. 8 is a schematic block diagram illustrating a first network switch 802 connected to a second network switch 804 via a DMII connection 812. The first network switch 802 includes a DMII port 810, several 10 Mbps Ethernet ports 806 and several optional 100 Mbps Ethernet ports 808. The second network switch 804 includes a DMII port 814, several 10 Mbps ports 818 and several optional 100 Mbps ports 816. The network switches 802 and 804 each include MAC and REC devices coupled to the DMII ports 810 and 814 for transmitting and receiving MII signals. A DMII cable 811 is connected between the ports 810 and 814. The DMII connection 812 is made according to any one of the previously illustrated types of DMII connections to couple the first network switch 802 to the second network switch 804. Thus, the ports 810 and 814 are implemented as MII ports, such as the ports 464, 464, or either one of the ports 810, 814 is implemented in a similar manner as the DMII port 452, or both of the ports 810, 814 are implemented in a similar manner as the DMII ports 402, 404. It is noted that either one or both of the ports 810, 814 may be implemented as MII ports, though each is generally referred to herein as a "DMII" port. The cable 811 is implemented in a similar manner as crossover cables 406, 470, 614, 664 or 706 depending upon the particular implementation, or is implemented according to any other of the DMII connection embodiments described herein.

The DMII ports 810 and 814 of the network switches 802 and 804, respectively, are clocked at 25, 33, 50, 66, 100 MHz, etc. or at any other desired frequency depending upon the DMII connection 812. The PHY devices are eliminated thereby reducing cost, even if operated at 25 MHz. If clocked at a higher frequency, the DMII connection 812 enables a higher bandwidth for data transfer between the network switches 802, 804. For example, when clocked at 50 MHz, the DMII connection 812 provides 200 Mbps of data transfer capacity in a half-duplex mode and 400 Mbps of data transfer capacity in a full-duplex mode between the network switches 802 and 804. Thus, the single DMII connection 812 enables 200% as much bandwidth as a single 100 Mbps Ethernet connection.

As systems are upgraded with new network devices, such as the network switches 802 and 804, MAC devices within the new network devices are implemented to operate at higher clock frequencies. These higher clock frequencies allow the MAC devices of the DMII ports 810 and 814 to transfer data at higher rates. With the network architecture specific connections, such as the 100 Mbps Ethernet and 10 Mbps Ethernet connections, the maximum data transfer rate is fixed. However, with the DMII connection 812, the data transfer rate between the network switches 802 and 804 may be substantially increased by increasing the clock frequency. Thus, the DMII connection 812 provides an additional important advantage of upgradability of network devices.

Figure 9:
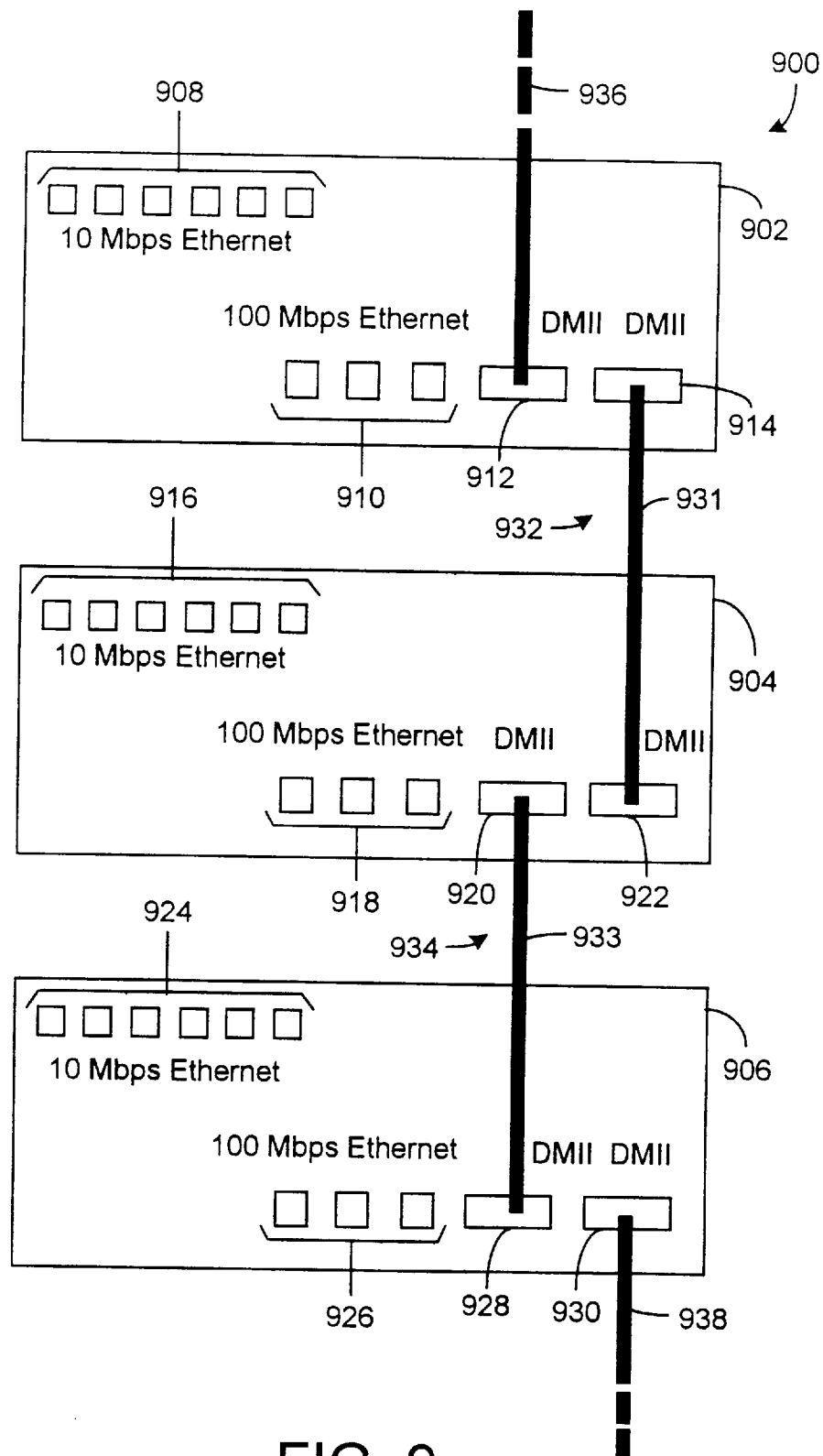
FIG. 9 is a schematic block diagram illustrating a plurality of network switches daisy-chained together using DMII connections according to the present invention.

FIG. 9 is a diagram illustrating a daisy-chained switch stack 900 interconnected by multiple DMII connections according to the present invention. As shown in FIG. 9, network switches 902, 904 and 906 are shown, each including at least two DMII ports for enabling a DMII connection according to the present invention. In particular, a first network switch 902 includes at least two DMII ports 912 and 914, a second network switch 904 includes at least two DMII ports 920 and 922, a third network switch 906 includes at least two MII ports 928 and 930, and so on. Each of the network switches 902, 904, 906, etc. include MAC and REC devices coupled to each of their DMII ports for transmitting and receiving MII signals. A DMII connection 932 is made between the network switches 902 and 904 with a crossover cable 931 connected between the DMII ports 914 and 922. A DMII connection 934 is made between the network switches 904 and 906 with a crossover cable 933 connected between the DMII ports 920 and 928. Furthermore, a crossover cable 936 is connected to the DMII port 912 of the network switch 902 and a crossover cable 938 is connected to the DMII port 930 of the network switch 906 to extend the daisy chain to as many network switches as desired. In this manner, any number of network switches are chained together since each network switch includes at least two DMII ports.

The DMII connections 932 and 934 are implemented in a similar manner as the DMII connection 812, and thus are implemented in any manner previously described. Thus, the DMII ports 912, 914, 920, 922, 928 and 930 may be implemented as MII ports or as DMII ports, even though generally referred to as "DMII" ports. The use of DMII connections eliminates the PHY devices and enables increased bandwidth with higher clock frequencies as previously described.

Figure 10:
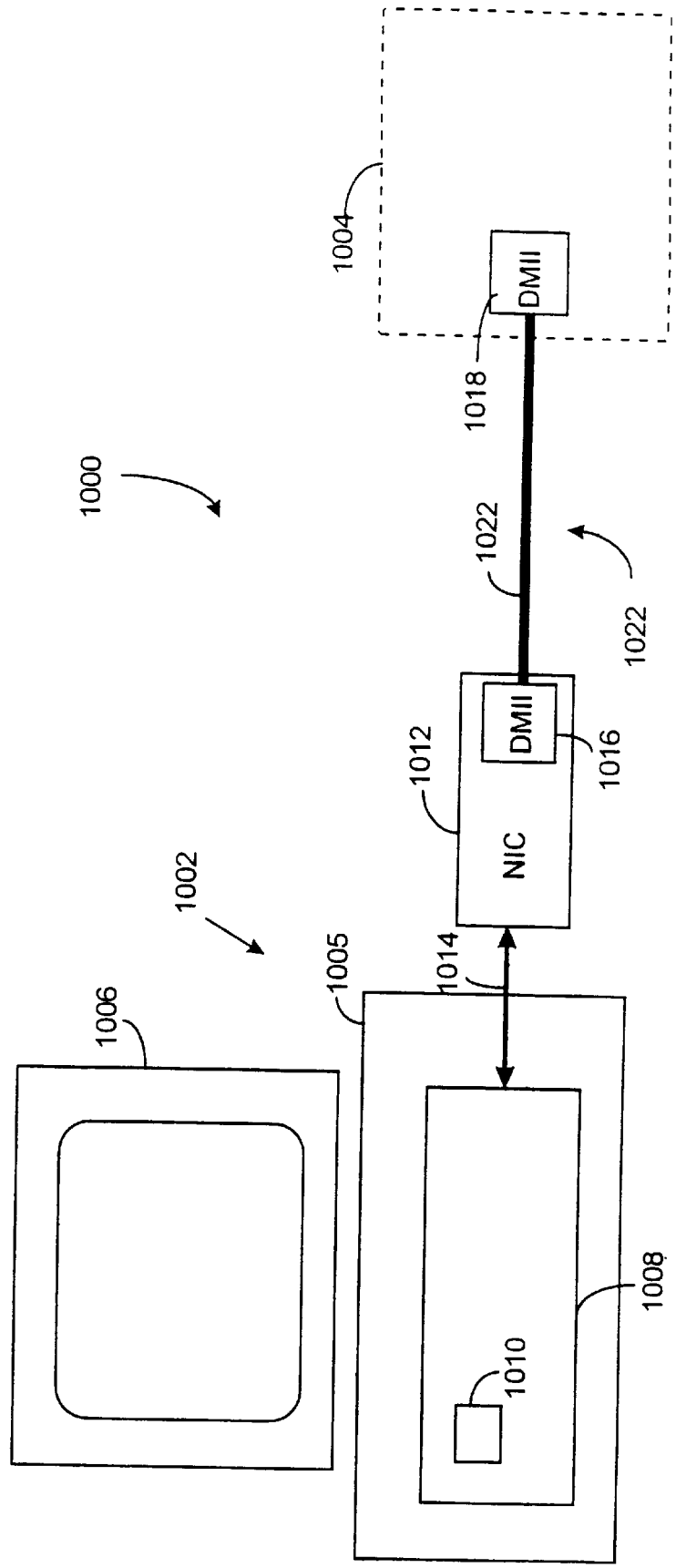
FIG. 10 is a schematic block diagram illustrating a computer system with a network interface card for coupling to another network device via with a DMII connection according to the present invention.

FIG. 10 is a schematic block diagram illustrating a network 1000 including a computer system 1002 coupled to a network device 1004 via a DMII connection 1022 according to the present invention. The computer system 1002 preferably includes a system unit 1005 and a monitor 1006. The system unit 1005 also includes a motherboard 1008 with a central processing unit (CPU) or processor 1010 mounted thereon, where the architecture implemented on the motherboard 1008 is any know architecture for personal computer systems (PCs) or the like as known to those skilled in the art, e.g. IBM® compatible, MacIntosh®, etc.

The motherboard 1008 further includes a peripheral or input/output (I/O) bus 1014 coupled to the processor 1010, where the I/O bus 1014 has appropriate slots for receiving a NIC 1012 implemented according to the present invention.

The I/O bus 1014 is implemented according to any known bus type, such as, for example, the Industry Standard Architecture (ISA), the Extended ISA (EISA), the Peripheral Component Interconnect (PCI), the Personal Computer Memory Card International Association (PCMIA), etc. Although not shown, it is understood that other components are typically included, such as a processor bus, main memory, bus controller for interfacing the processor bus and the I/O bus 1014, a video controller and associated video memory for facilitating display on the monitor 1006, etc.

The NIC 1012 includes a DMII port 1016 for coupling to a DMII cable 1021. The NIC 1012 also typically includes a local processor (not shown) for transferring data between the DMII port 1016 and the I/O bus 1014 of the computer system 1002. The network device 1004 comprises either another computer, a repeater, a bridge, a router, a brouter, a network switch or any other type of network device, and includes a DMII port 1018 according to the present invention for coupling to the cable 1021. The NIC 1012 and the network device 1004 each includes MAC and REC devices coupled to the DMII ports 1016 and 1018, respectively, for transmitting and receiving MII signals. The DMII connection 1022 is implemented according to any of the previously described types of DMII connections of the present invention. The DMII connection 1022 provides a lower cost connection between the computer system 1006 and the network device 1004, and enables a higher bandwidth depending upon the clock frequency of the DMII connection 1022 as previously described.

The teachings of the present invention may be applied to other media independent interface technologies as well. A standard is currently being developed by IEEE to describe the Gigabit media independent interface (GMII), which provides 8 transmit bits of data and 8 receive bits of data clocked at 125 MHz to provide one Gbps performance in a half-duplex mode or two Gbps in a full duplex mode. The teachings of the present invention may be applied to the GMII in a similar manner to provide a direct GMII (DGMII) connection between network devices using GMII technology. In this fashion, bandwidth between the devices implementing GMII will be significantly increased while removing the costs associated with a network segment that would otherwise be installed between the devices.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A network device including a direct media independent interface connection, comprising:

a data link circuit that transmits and receives data according to a media independent interface format including media independent interface transmit and receive signals;

a connector that enables external connection of the media independent interface signals;

a crossover connection coupled to the data link circuit and the connector that crosses media independent interface transmit signals with media independent interface receive signals; and a clock circuit coupled to the crossover connection that asserts at least one clock signal as a media independent interface clock signal to synchronize data transfer.

2. The network device of claim 1, wherein:

the media independent interface transmit signals include transmit data signals, a transmit delimiter signal, a transmit error signal and a transmit clock signal; and the media independent interface receive signals include receive data signals, a receive delimiter signal, a receive error signal and a receive clock signal.

3. The network device of claim 1, wherein the connector is a standard media independent interface connector.

4. The network device of claim 1, wherein the connector is a minimum profile connector including only 14 signal contacts to couple four transmit data signals, four receive data signals, a transmit delimiter signal, a receive delimiter signal, a transmit error signal, a receive error signal, a transmit clock signal and a receive clock signal.

5. The network device of claim 1, where in the connector includes only 28 contacts, including 14 contacts to couple four transmit data signals, four receive data signals, a transmit delimiter signal, a receive delimiter signal, a transmit error signal, a receive error signal, a transmit clock signal and a receive clock signal, and 14 common signal return path contacts.

6. The network device of claim 1, wherein the clock circuit asserts both a transmit clock signal and a receive clock signal.

7. The network device of claim 1, wherein the at least one clock signal operates at a frequency of at least 25 megahertz.

8. The network device of claim 1, wherein the crossover connection comprises a crossover cable for coupling to the connector.

9. The network device of claim 1, further comprising a grounding circuit that grounds at least one of the media independent interface signals.

10. The network device of claim 1, further comprising:

a second data link circuit that transmits and receives data according to the media independent interface format including a second set of media independent interface transmit and receive signals;

a second connector that enables external connection of the second set of media independent interface signals;

a second crossover connection coupled to the data link circuit and the second connector that crosses media independent interface transmit signals with media independent interface receive signals of the second set of media independent interface signals; and a second clock circuit coupled to the second crossover connection that asserts at least one clock signal as a media independent interface clock signal of the second set of media independent interface signals to synchronize data transfer.

11. A direct media independent interface connection for establishing a media independent interface connection between a first network device and a second network device, the direct media independent interface connection comprising:

a first network device including a first media independent interface port including transmit and receive signals;

a second network device including a second media independent interface port including transmit and receive signals;

a crossover connection that couples transmit signals of the first media independent interface port to receive signals of the second media independent interface port and that couples receive signals of the first media independent interface port to transmit signals of the second media independent interface port; and at least one clock circuit that asserts at least one clock signal on the crossover connection to synchronize data transfer between the first and second media independent interface ports.

12. The direct media independent interface connection of claim 11, wherein the at least one clock circuit comprises:

a first clock circuit within the first media independent interface port for asserting a first clock signal; and a second clock circuit within the second media independent interface port for asserting a second clock signal.

13. The direct media independent interface connection of claim 11, further comprising:

the first and second media independent interface ports including collision, carrier sense and management signals;

a first grounding circuit within the first media independent interface port for grounding the collision, carrier sense and management signals of the first media independent interface port; and a second grounding circuit within the second media independent interface port for grounding the collision, carrier sense and management signals of the second media independent interface port.

14. The direct media independent interface connection of claim 11, wherein the crossover connection comprises:

a crossover cable for coupling between the first and second media independent interface ports.

15. The direct media independent interface connection of claim 14, wherein the clock circuit is provided within the crossover cable.

16. The direct media independent interface connection of claim 14, further comprising:

the first and second media independent interface ports including collision, carrier sense and management signals;

the crossover cable including signal lines for coupling together the collision, carrier sense and management signals of the first and second media independent interface ports; and a grounding circuit within the crossover cable for grounding the collision, carrier sense and management signals.

17. The direct media independent interface connection of claim 14, wherein the crossover cable includes:

a standard media independent interface cable with standard media independent interface connectors; and a crossover adapter coupled to the standard media independent interface cable.

18. The direct media independent interface connection of claim 14, wherein the crossover cable comprises:

a minimum profile crossover cable that couples only transmit data signals, receive data signals, frame delimiter signals, error signals and clock signals.

19. The direct media independent interface connection of claim 14, wherein the crossover cable only couples transmit data signals, receive data signals, frame delimiter signals, error signals, clock signals and a plurality of common signals to provide a dedicated signal return path for each of the transmit data signals, receive data signals, frame delimiter signals, error signals and clock signals.

20. A computer system, comprising:

a motherboard, comprising:

a processor; and a peripheral bus coupled to the processor; and a network interface card for coupling to the peripheral bus, wherein the network interface card comprises:

a data link circuit that transmits and receives data according to a media independent interface format including media independent interface transmit and receive signals;

a connector that enables external connection of the media independent interface signals;

a crossover connection coupled to the data link circuit and the connector that crosses media independent interface transmit signals with media independent interface receive signals; and a clock circuit coupled to the crossover connection that asserts at least one clock signal as a media independent interface clock signal to synchronize the media independent interface transmit and receive signals.

* * * * *